(12) United States Patent
Mitelman et al.

(10) Patent No.: US 7,497,382 B2
(45) Date of Patent: Mar. 3, 2009

(54) METHOD OF AND CONTROL SWITCH ARRANGEMENT FOR CONTROLLING DIFFERENT OPERATIONAL STATES IN AN ELECTRO-OPTICAL READER

(75) Inventors: Yuly Mitelman, Stony Brook, NY (US); Joseph Giordano, Bayville, NY (US); Amit Pai, Medford, NY (US)

(73) Assignee: Symbol Technologies, Inc., Hortsville, NY (US)

( * ) Notice: Subject to any disclaimer, the term of this patent is extended or adjusted under 35 U.S.C. 154(b) by 490 days.

(21) Appl. No.: 11/288,517

(22) Filed: Nov. 29, 2005

(65) Prior Publication Data

US 2007/0119948 A1    May 31, 2007

(51) Int. Cl.
*G06K 7/10* (2006.01)

(52) U.S. Cl. ............. 235/462.48; 235/454; 235/462.43; 235/462.45; 235/462.49
(58) Field of Classification Search ............ 235/462.48, 235/454, 462.43, 462.45, 462.49
See application file for complete search history.

(56) References Cited

U.S. PATENT DOCUMENTS

| 2003/0020629 A1* | 1/2003 | Swartz et al. .......... 340/825.25 |
| 2003/0234291 A1* | 12/2003 | Wulff et al. ............ 235/462.48 |
| 2006/0208086 A1* | 9/2006 | Rudeen et al. ......... 235/472.01 |

* cited by examiner

*Primary Examiner*—Michael G Lee
*Assistant Examiner*—Kristy A Haupt
(74) *Attorney, Agent, or Firm*—Kirschstein, et al.

(57) ABSTRACT

A control switch arrangement for sequentially controlling different operating states in a moving beam reader or an imager employs a force sensing resistor switch requiring a low actuation force, and a control switch with improved tactile feedback and ergonomic efficiency between the switches.

18 Claims, 6 Drawing Sheets

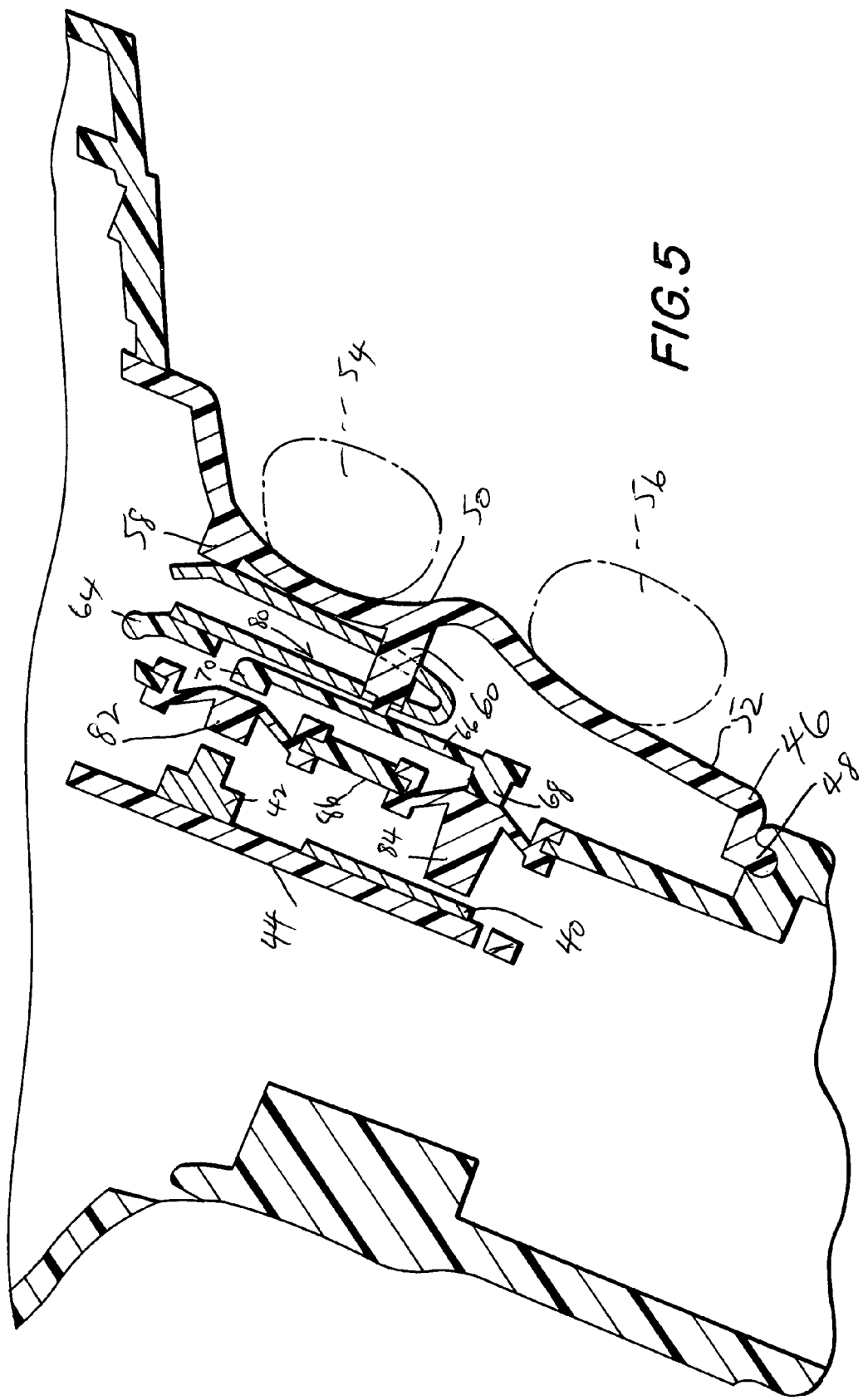

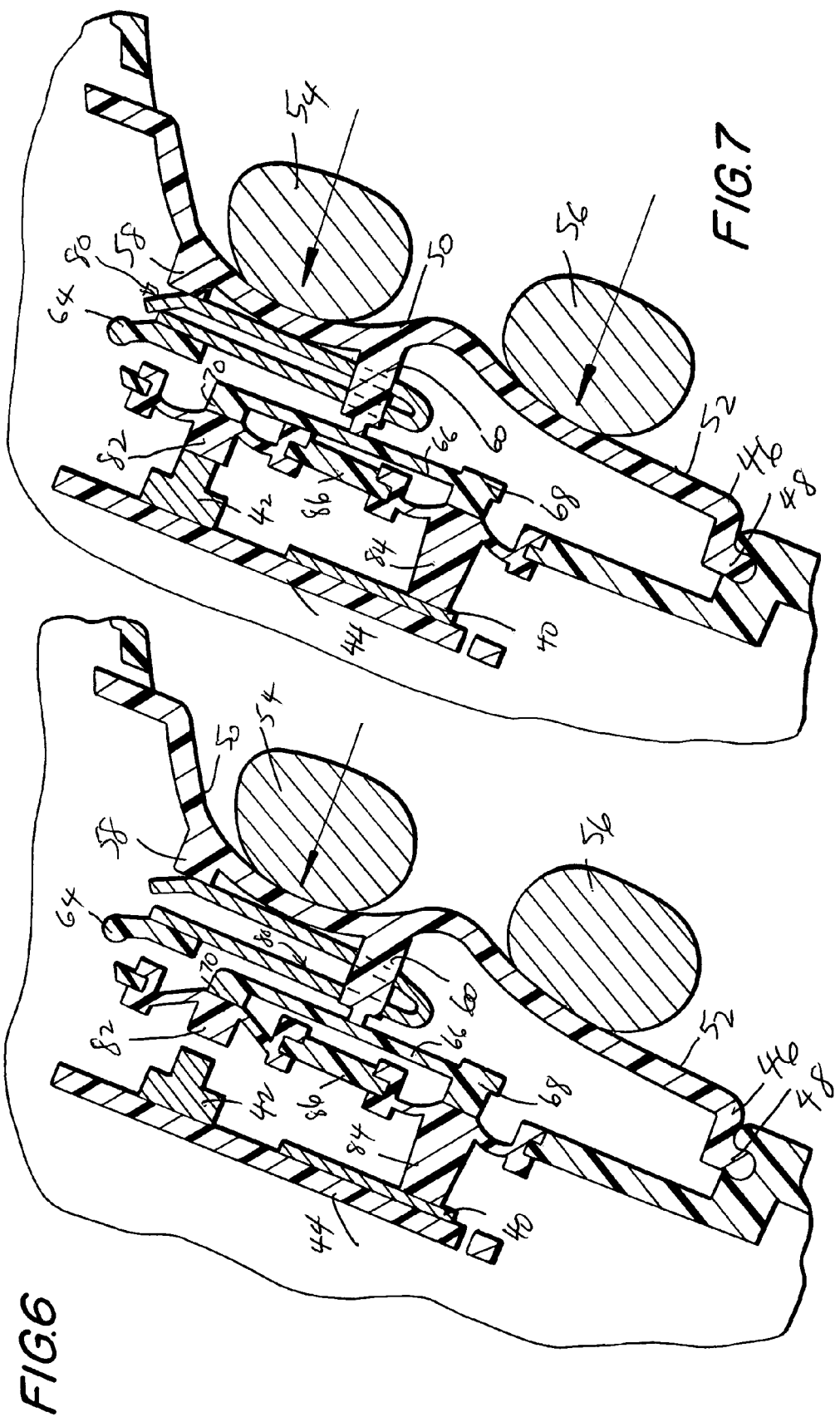

METHOD OF AND CONTROL SWITCH ARRANGEMENT FOR CONTROLLING DIFFERENT OPERATIONAL STATES IN AN ELECTRO-OPTICAL READER

BACKGROUND OF THE INVENTION

1. Field of the Invention

The present invention generally relates to electro-optical readers for reading indicia, for example, bar code symbols, having parts with different light reflectivities and, in particular, to a control switch arrangement for, and a method of, controlling different operational states in such readers.

2. Description of the Related Art

Various electro-optical readers have previously been developed for reading bar code symbols appearing on a label, or on a surface of a target. The bar code symbol itself is a coded pattern of indicia. Generally, the readers electro-optically transform graphic indicia of the symbols into electrical signals which are decoded into alphanumeric characters. The resulting characters describe the target and/or some characteristic of the target with which the symbol is associated. Such characters typically comprise input data to a data processing system for applications in point-of-sale processing, inventory control, article tracking and the like. Electro-optical readers of this general type have been disclosed, for example, in U.S. Pat. Nos. 4,251,798; 4,369,361; 4,387,297; 4,409,470, 4,760, 248 and 4,896,026, all of which have been assigned to the assignee of the present invention.

As disclosed in some of the above patents, a particularly advantageous embodiment of such a reader resided in emitting a laser light beam from a hand-held, portable laser scanning head which was supported by a user; aiming the head and, more particularly, the laser light beam, at a symbol to be read; repetitively scanning the laser beam in a series of scans across the symbol; detecting the scanned laser light which is reflected off the symbol; and decoding the detected reflected light. Inasmuch as the laser light beam was usually, but not always, generated by a helium-neon gas laser which emitted red laser light at a wavelength of about 6328 Angstrom units, the red laser light was visible to the user and, thus, the user, without difficulty, could properly aim the head and position and maintain the emitted red laser light on and across the symbol during the scanning.

However, in the event that the laser light beam was generated by a semiconductor laser diode, as, by way of example, see U.S. Pat. Nos. 4,387,297; 4,409,470 and 4,460,120, then the aiming of the head relative to the symbol was rendered more difficult when the laser diode emitted laser light which was not readily visible to the user. For some laser diodes, the laser light was emitted at a wavelength of about 7800 Angstrom units, which was very close to infrared light and was on the borderline of being visible. Even with the advent of laser diodes whose emitted light was in the visible wavelength range, ambient light tended to mask out the laser diode light. Furthermore, if the laser diode light was moving, for example, by being swept across the symbol, and especially if the laser diode light was being swept at fast rates of speed on the order of a plurality of times per second, for example, at a rate of 40 scans per second, then the laser diode light was not readily visible to the user, even in a darkened room. Hence, due to one or more of such factors as the wavelength of the laser light, the intensity of the laser light, the intensity of the ambient light in the environment in which the laser light was operating, the scanning rate, as well as other factors, the laser diode light was rendered "non-readily visible".

This non-readily visible laser diode light did not enable the user, however, to readily aim the laser diode light at the symbol, at least not without some difficulty and practiced effort because, simply put, the user could not see the laser diode light. The user, therefore, was required to hunt around by trial and error, hope that the scanning laser diode light was eventually properly positioned on and across the symbol, and wait until the scanning system advised him, typically by the lighting of an indicator lamp or by the sounding of an auditory beeper, that the symbol had indeed been successfully decoded and read. This hunting technique was a less-than-efficient and time-consuming procedure for reading symbols, particularly in those applications where a multitude of symbols had to be read every hour and every day.

In an attempt to enable the user to readily aim the laser diode light at the symbol, U.S. Pat. No. 4,835,374 proposed an aiming light arrangement to assist the user in visually locating and aiming the head at each symbol when non-readily-visible laser light was employed. The aiming light arrangement utilized a visible light source, e.g., one or more light emitting diodes, which was separate and distinct from the laser light source. A manually-operated trigger was employed to actuate the aiming light arrangement in a first operational state of the trigger for visibly illuminating a region on the symbol. This visible region was used for aiming purposes. Thereupon, in a second operational state of the trigger, the laser light source was actuated, thereby initiating the reading of the symbol.

Symbols can also be read by employing imaging devices. For example, an image sensor device may be employed which has a two-dimensional array of cells or photosensors which correspond to image elements or pixels in a field of view of the device. Such an image sensor device may include a two-dimensional or area charge coupled device (CCD) or complementary metal oxide semiconductor (CMOS) device and associated circuits for producing electronic signals corresponding to a two-dimensional array of pixel information for a field of view.

It is therefore known to use a CCD for capturing a monochrome image of a barcode symbol to be read as, for example, disclosed in U.S. Pat. No. 5,703,349. It is also known to use a CCD with multiple buried channels for capturing a full color image of a target as, for example, disclosed in U.S. Pat. No. 4,613,895.

For many applications, the imaging device is accommodated in a hand-held package which may be pistol-shaped. Moreover, such imaging devices are typically equipped with external lighting to illuminate the symbol to be captured. In addition, such external lighting serves as an aiming source to indicate to the operator just where the symbol is located relative to the cellular array.

In another known attempt, U.S. Pat. No. 5,117,098 disclosed a multi-state trigger using dual, double-action switches. However, the known double-action switches are not altogether satisfactory from an ergonomic point of view and typically require a long travel stroke between actuations of the switches, as well as some sort of positive tactile feedback for at least one of the switches, and also require a relatively high actuation force to control the switches. All of these factors, plus the lack of availability of high precision switches capable of very long working lifetimes, have proven disadvantageous in making such readers as ergonomically efficient as possible.

SUMMARY OF THE INVENTION

OBJECTS OF THE INVENTION

One object of this invention is to provide an improved control switch arrangement for and method of controlling different operational states for improving performance of a reader for reading a data-encoded symbol.

Another object of this invention is to provide a control switch arrangement which is compact, lightweight, durable and efficient in construction and quiet and reliable in operation, and thus is ideally suited for portable hand-held applications.

A further object of this invention is to provide a multi-position, manually-depressible trigger arrangement for controlling aiming and reading.

Still another object of this invention is to provide a multi-position trigger arrangement for controlling the reading of symbols located at different distances from the arrangement.

FEATURES OF THE INVENTION

In keeping with these objects and others which will become apparent hereinafter, one feature of this invention resides, briefly stated, in a control switch arrangement for, and a method of, controlling operational states in an electro-optical reader for reading indicia, such as one-and/or two-dimensional bar code symbols. The reader can be a moving beam reader, or an image capture device.

Advantageously, the arrangement includes a force sensing resistor (FSR) switch and a control switch mounted within the reader, preferably on a common circuit board. A trigger assembly is mounted on the reader for transmitting a first force on the FSR switch over a first travel stroke to initiate a first of the operational states, and for transmitting a second force on the control switch over a second travel stroke to initiate a second of the operational states.

Using an FSR switch enables a low actuation force to be used, typically from 0.2 to 1.0 Newtons, which is much less than the force required for a conventional tactile switch, typically 1.4 Newtons. Using an FSR switch also enables a minimal travel stroke, typically on the order of less than hundredths of a millimeter. This also means that the second stroke to initiate the control switch can be made longer to better ergonomically distinguish between actuation of the switches.

In the preferred embodiment, the trigger assembly includes a plate pivotable in one direction to transmit the first force on the FSR, and a beam pivotable in an opposite direction to transmit the second force on the control switch. A displaceable trigger guard has at least one finger depression, and a pair of projections extending rearwardly to engage the plate and the beam during displacement of the trigger guard. A pair of resilient elements is respectively positioned between the projections and the FSR and control switches. A return spring constantly biases the trigger guard to an undisplaced position.

One of the operational states can advantageously be an aiming state, while the other operational state can advantageously be a reading state. In the case of an imaging device, the aiming state employs external lighting to illuminate the symbol, while in the case of a moving beam device, the aiming state may energize an aiming light pattern, either static or dynamic. If aiming is not desired, then one operational state can be for reading close-in symbols, while the other operational state can be used for reading far-out symbols.

In accordance with this invention, the FSR switch enables actuation at very low actuation forces and over a very short travel stroke. A greater travel stroke can be designed to actuate the control switch, even with a shorter travel stroke for the control switch, thereby enabling ergonomic efficiency and differentiation between the FSR and the control switches.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a broken-away view of the control switch arrangement in a rest or undisplaced position; and FIGS. 6 and 7 are respective views of the control switch arrangement in different operational states in accordance with this invention.

DETAILED DESCRIPTION OF THE PREFERRED EMBODIMENTS

Figure 1:
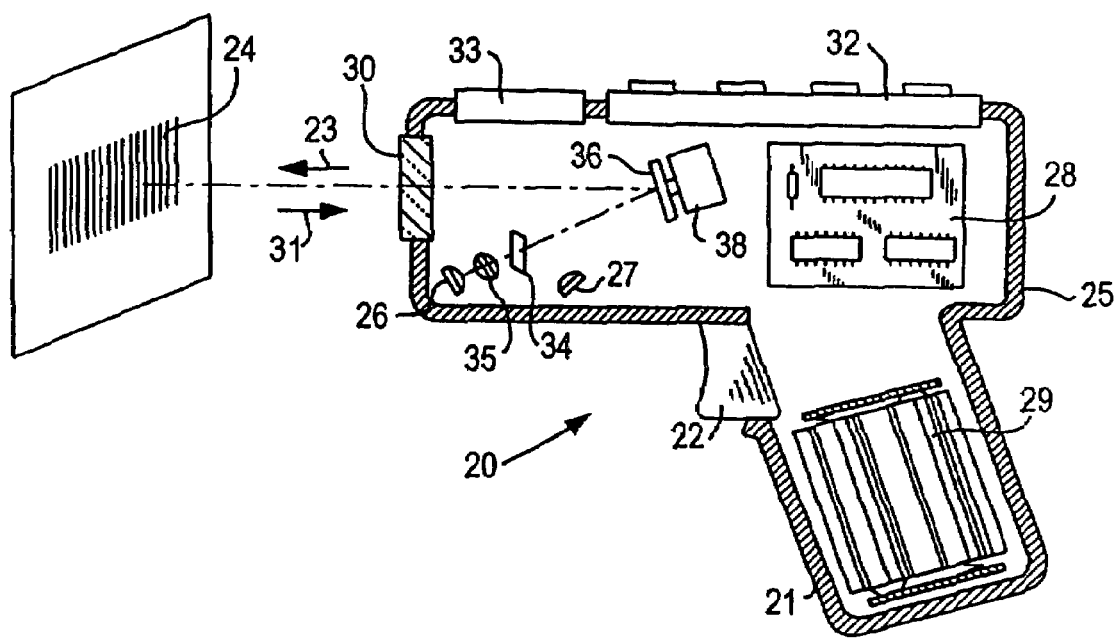
FIG. 1 is a schematic diagram of a hand-held reader for reading a bar code symbol in accordance with the prior art.

Reference numeral 20 in FIG. 1 generally identifies a hand-held reader for electro-optically reading indicia, such as bar code symbol 24, located in a range of working distances therefrom. The reader 20 has a pistol grip handle 21 and a manually actuatable trigger 22 which, when depressed, enables a light beam 23 to be directed at the symbol 24. The reader 20 includes a housing 25 in which a light source 26, a light detector 27, signal processing circuitry 28, and a battery pack 29 are accommodated. A light-transmissive window 30 at a front of the housing enables the light beam 23 to exit the housing, and allows light 31 scattered off the symbol to enter the housing. A keyboard 32 and a display 33 may advantageously be provided on a top wall of the housing for ready access thereto.

In use, an operator holding the handle 21 aims the housing at the symbol and depresses the trigger. The light source 26 emits a light beam which is optically modified and focused by an optical focusing assembly 35 to form a beam spot on the symbol 24. The beam passes through a beam splitter 34 to a scan mirror 36 which is repetitively oscillated at a scan rate of at least 20 scans a second by a motor drive 38. The scan mirror 36 reflects the beam incident thereon to the symbol 24 and sweeps the beam spot across the symbol in a scan pattern. The scan pattern can be a line extending lengthwise along the symbol along a scan direction, or a series of lines arranged along mutually orthogonal directions, or an omnidirectional pattern, just to name a few possibilities.

The reflected light 31 has a variable intensity over the scan pattern and passes through the window 30 onto the scan mirror 36 where it is reflected onto the splitter 34 and, in turn, reflected to the photodetector 27 for conversion to an analog electrical signal. As known in the art, the signal processing circuitry 28 digitizes and decodes the signal to extract the data encoded in the symbol.

Figure 2:
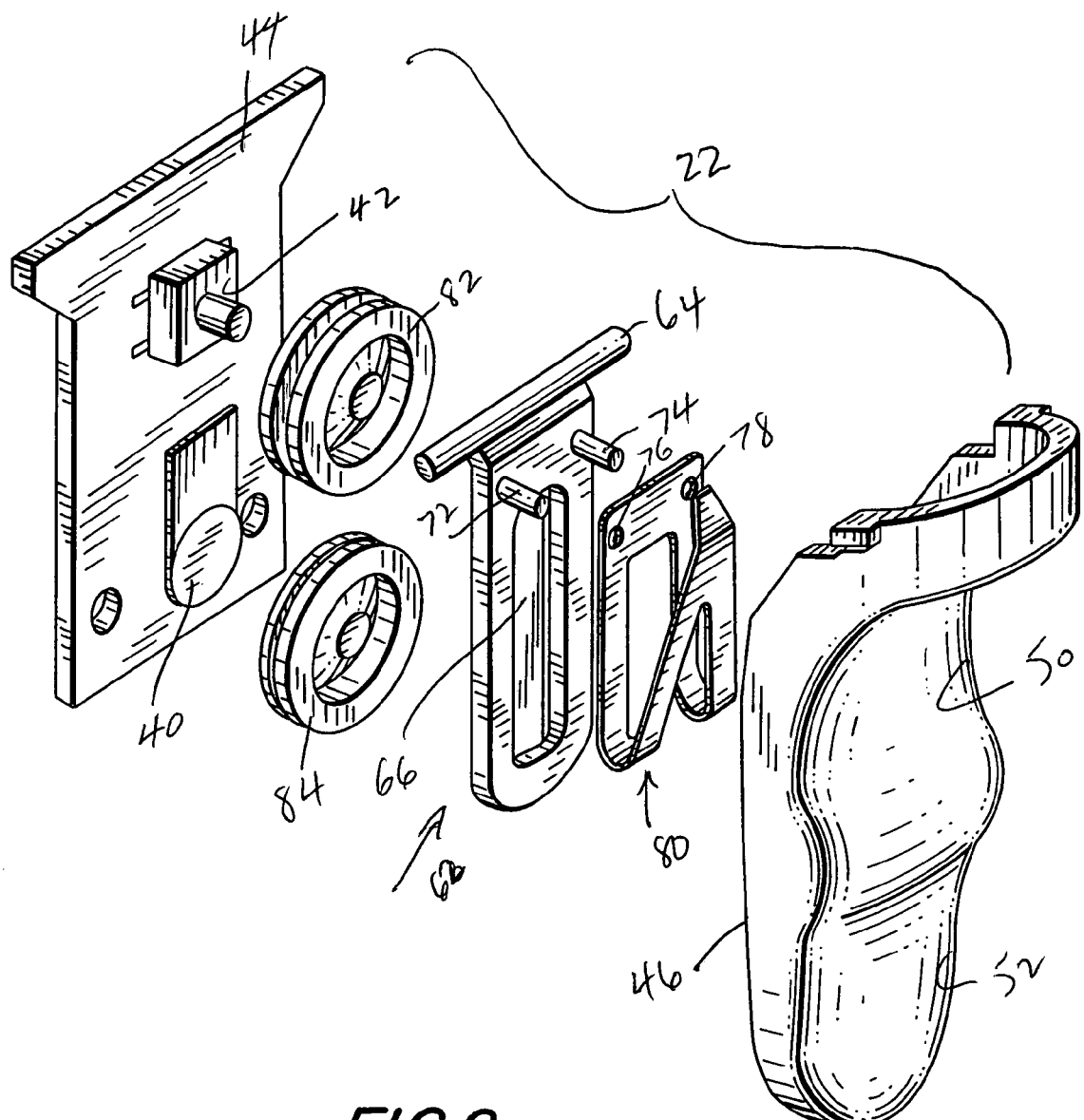
FIG. 2 is an exploded perspective view of a control switch arrangement used in the hand-held reader of FIG. 1 in accordance with this invention.

In accordance with this invention, the manually actuatable trigger 22 of FIG. 1 is replaced by a control switch arrangement, as shown in exploded view in FIG. 2. The arrangement includes a force sensing resistor (FSR) switch 40 and a control switch 42, preferably mounted on a common circuit board 44.

Figure 3:
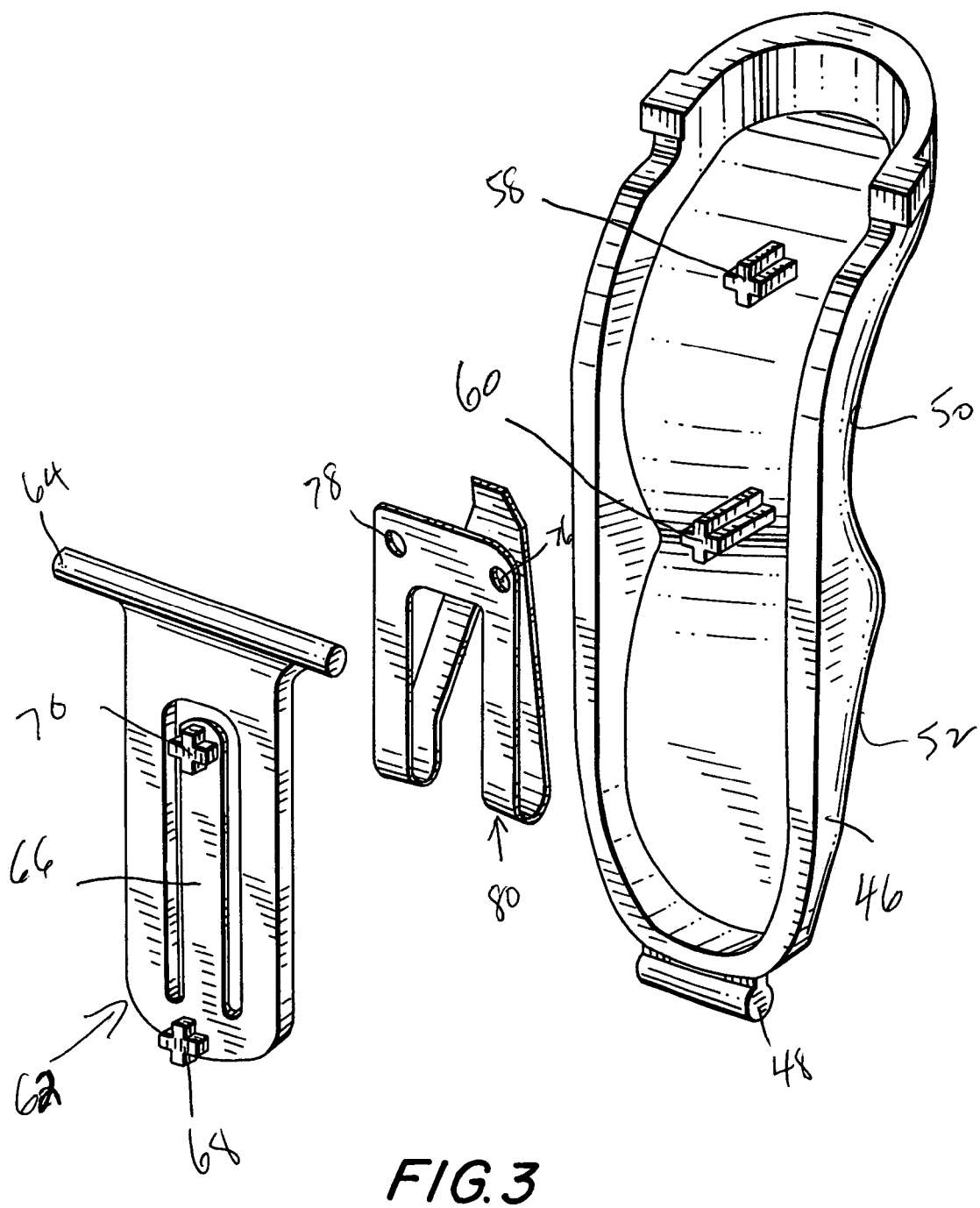
FIG. 3 is a rear perspective view of some of the components of the control switch arrangement of FIG. 2.
Figure 4:
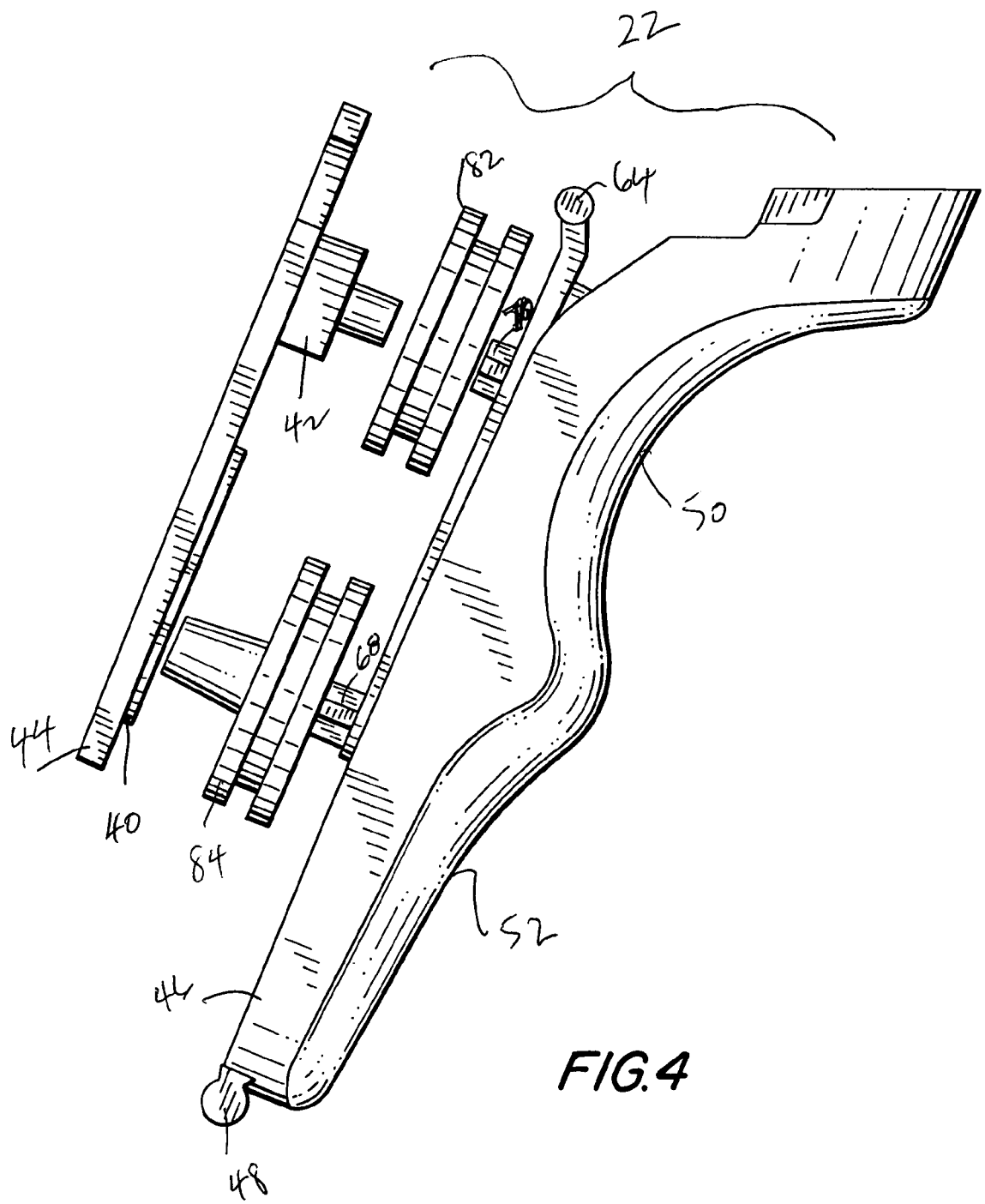
FIG. 4 is a side elevational assembled view of the control switch arrangement of FIG. 2.

A trigger guard 46 is mounted on the reader 20 for pivoting movement about a lower hinge rod 48 (see FIG. 3). The trigger guard 46 preferably has one, or two, finger-receiving depressions 50, 52 for receiving respective fingers 54, 56 of an operator. As best seen in FIGS. 3-4, an upper rear projection 58 and a lower rear projection 60 extend rearwardly from the trigger guard 46, preferably integrally therewith.

An actuating plate 62 is also pivotably mounted on the reader about an upper hinge rod 64. As best seen in FIG. 3, the plate 62 has a cantilever central beam 66 integral therewith, as well as a pair of rear projections 68, 70. The plate 62 also has a pair of front pins 72, 74 for insertion into a pair of guide holes 76, 78 of a bent return spring 80 having one arm resting against the plate 60 and another arm resting against the trigger guard 46.

The arrangement still further includes an upper resilient element or grommet 82 positioned between the rear projection 70 and the control switch 42, as well as a lower resilient element or grommet 84 positioned between the rear projection 68 and the FSR switch 40. As best seen in FIGS. 5-8, the grommets 82, 84 have different cross-sections and are commonly mounted around their respective peripheries on extensions of the reader.

In the rest position of FIG. 5, it will be seen that the lower grommet 84 is closely spaced relative to the FSR switch 40, whereas the upper grommet 82 is more further spaced relative to the control switch 42. The spring 80 constantly biases the trigger guard 46 to this rest position.

Next, if one of the operator's fingers, for example, finger 54 is pulled back into the depression 50, as depicted in FIG. 6, then the trigger guard 46 is pivoted about lower hinge rod 48 against the force of the spring 80. The rear projection 60 pivots the plate 62 about the upper hinge rod 64 in one direction and, in turn, transmits a first force from rear projection 68 through the lower grommet 84 to close the FSR switch 40 over the relatively short travel stroke described above.

Next, if the same finger, or if two fingers 54, 56 are used to pull back on the trigger guard, as depicted in FIG. 7, then the trigger guard is further displaced back into the reader against the force of the restoring spring. The rear projection 60 now bends the beam 66 in an opposite direction, and the rear projection 70 transmits a second force through the upper grommet 82 to close the control switch 42 over the relatively longer travel stroke described above. Releasing of finger pressure on the guard allows the spring 80 to return the arrangement to the rest position of FIG. 5.

Thus, sequential activation of the FSR switch and the control switch is achieved with improved ergonomic efficiency. Very little force is needed to close the FSR switch, and a very little travel stroke needs to be traversed. A little greater travel stroke can be assigned to close the control switch, thereby improving the tactile feedback between these two switches.

It will be understood that each of the elements described above, or two or more together, also may find a useful application in other types of constructions differing from the types described above.

While the invention has been illustrated and described as embodied in a method of and control switch arrangement for controlling different operational states in an electro-optical reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A control switch arrangement for controlling different operational states in an electro-optical reader, comprising:
  a) a force sensing resistor (FSR) switch and a control switch mounted within the reader; and
  b) a trigger assembly mounted on the reader and including a plate pivotable in one direction for transmitting a first force on the FSR switch over a first travel stroke to initiate a first of the operational states, and a beam pivotable in an opposite direction for transmitting a second force on the control switch over a second travel stroke to initiate a second of the operational states.

2. The arrangement of claim 1, wherein the FSR switch and the control switch are mounted on a common circuit board.

3. The arrangement of claim 1, wherein the assembly includes a displaceable trigger guard having at least one finger depression, and a pair of projections extending rearwardly to engage the plate and the beam during displacement of the trigger guard.

4. The arrangement of claim 3, and a pair of resilient elements respectively positioned between one of the projections and the FSR switch, and between another of the projections and the control switch.

5. The arrangement of claim 3, and a return spring for returning the trigger guard to an undisplaced position.

6. The arrangement of claim 1, wherein at least one of the first and second forces and the first and second travel strokes are different.

7. The arrangement of claim 1, wherein initiation of one of the operational states causes an aiming light to illuminate at least a part of an indicium to be electro-optically read, and wherein initiation of another of the operational states causes electro-optical reading of the indicium.

8. The arrangement of claim 1, wherein initiation of one of the operational states causes an indicium to be electro-optically read at one working range from the reader, and wherein initiation of another of the operational states causes the indicium to be electro-optically read at another working range from the reader.

9. The arrangement of claim 1, wherein initiation of one of the operational states causes an indicium to be electro-optically imaged and read.

10. A method of controlling different operational states in an electro-optical reader, comprising the steps of:
  a) mounting a force sensing resistor (FSR) switch and a control switch within the reader;
  b) transmitting a first force on the FSR switch over a first travel stroke to initiate a first of the operational states by pivoting a plate in one direction; and c) transmitting a second force on the control switch over a second travel stroke to initiate a second of the operational states by pivoting a beam in an opposite direction.

11. The method of claim 10, wherein the mounting step is performed by mounting the FSR switch and the control switch on a common circuit board.

12. The method of claim 10, wherein the pivoting of the plate and the beam is performed by displacing a trigger guard having one rear projection for engaging the plate, and another rear projection for engaging the beam.

13. The method of claim 12, and positioning one resilient element between one of the rear projections and the FSR switch, and another resilient element between the other of the rear projections and the control switch.

14. The method of claim 12, and returning the trigger guard to an undisplaced position.

15. The method of claim 10, wherein at least one of the first and second forces and the first and second travel strokes are different.

16. The method of claim 10, wherein initiation of one of the operational states causes an aiming light to illuminate at least a part of an indicium to be electro-optically read, and wherein initiation of another of the operational states causes electro-optical reading of the indicium.

17. The method of claim 10, wherein initiation of one of the operational states causes an indicium to be electro-optically read at one working range from the reader, and wherein initiation of another of the operational states causes the indicium to be electro-optically read at another working range from the reader.

18. The method of claim 10, wherein initiation of one of the operational states causes an indicium to be electro-optically imaged and read.

\* \* \* \* \*

UNITED STATES PATENT AND TRADEMARK OFFICE
CERTIFICATE OF CORRECTION

| | | |
|---|---|---|
| PATENT NO. | : 7,497,382 B2 | Page 1 of 1 |
| APPLICATION NO. | : 11/288517 | |
| DATED | : March 3, 2009 | |
| INVENTOR(S) | : Mitelman et al. | |

It is certified that error appears in the above-identified patent and that said Letters Patent is hereby corrected as shown below:

ON THE FACE PAGE

On the Face Page, in Field (73), under "Assignee", in Column 1, Line 1, delete "Hortsville," and insert -- Holtsville, --, therefor.

IN THE SPECIFICATION

In Column 4, Line 64, delete "pattern,just" and insert -- pattern, just --, therefor.

Signed and Sealed this

Sixteenth Day of February, 2010

David J. Kappos
*Director of the United States Patent and Trademark Office*